United States Patent [19]

Muschalek, Jr.

[11] 4,312,620
[45] Jan. 26, 1982

[54] SPARE TIRE RACK

[76] Inventor: Ben E. Muschalek, Jr., Box 198, McCamey, Tex. 79752

[21] Appl. No.: 91,744

[22] Filed: Nov. 6, 1979

[51] Int. Cl.³ .............................................. B62D 43/04
[52] U.S. Cl. ................................ 414/466; 224/42.12; 224/42.23
[58] Field of Search ............... 414/463, 464, 465, 466; 224/42.06, 42.12, 42.21, 42.23

[56] References Cited

U.S. PATENT DOCUMENTS

| | | | |
|---|---|---|---|
| 3,369,683 | 2/1968 | Richards | 414/466 |
| 3,435,971 | 4/1969 | Powell | 414/463 |
| 3,494,493 | 2/1970 | Fowler | 414/466 |
| 3,782,568 | 1/1974 | Alexander | 414/463 X |
| 4,047,629 | 9/1977 | Klein | 414/463 |
| 4,093,088 | 6/1978 | Hildebrandt et al. | 224/42.23 X |

FOREIGN PATENT DOCUMENTS

| | | | |
|---|---|---|---|
| 682802 | 11/1952 | United Kingdom | 414/466 |
| 1120909 | 7/1968 | United Kingdom | 224/42.23 |

Primary Examiner—Leslie J. Paperner
Attorney, Agent, or Firm—Harvey B. Jacobson

[57] ABSTRACT

An elongated longitudinally extending guide structure supported beneath the rear of a pickup truck with the forward end of the guide structure pivotally supported from the pickup truck frame for oscillation about a horizontal transverse axis. An elongated wheel supporting rack is slidably supported from the guide structure for longitudinal displacement relative thereto and the rack is shiftable between forward and rear positions relative to the guide structure. In the forward position of the rack front and rear ends of the latter are supported from the guide structure and when in the rear position, the rear end of the rack is disengaged from and displaced rearwardly of the rear end of the guide structure. The rear end of the rack and the rear end of the associated vehicle include coacting latching structure effective to latch the rack in its forward position relative to the guide structure and the latter in its raised horizontal position beneath the underside of the rear of the associated pickup truck.

7 Claims, 4 Drawing Figures

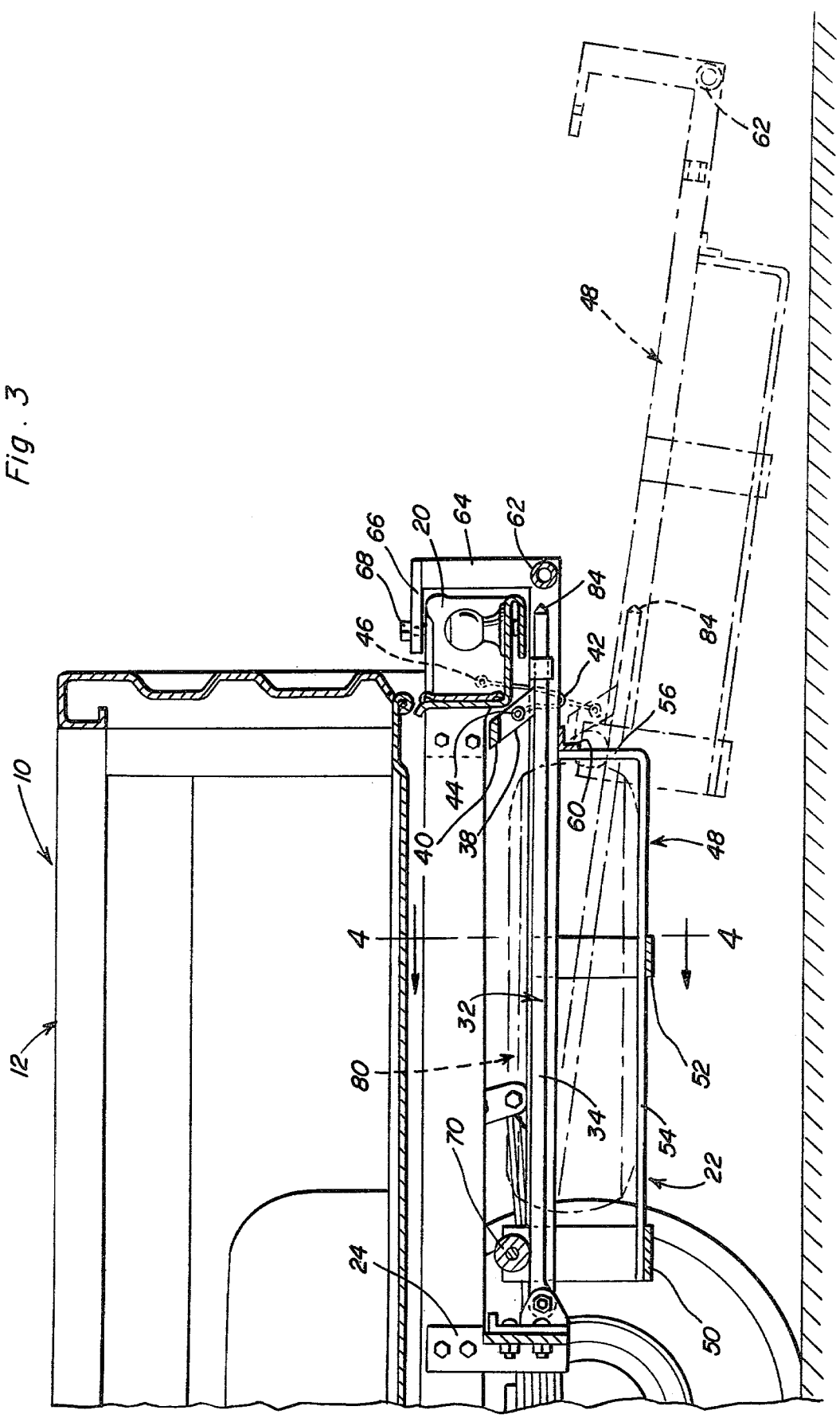

SPARE TIRE RACK

BACKGROUND OF THE INVENTION

Various forms of spare tire racks for pickup trucks have been heretofore provided for supporting a pickup truck spare tire beneath the rear portion of the load bed of the pickup truck. Many of these tire racks are difficult to operate and substantially impossible for a weak or disabled person to operate in the case of a flat tire and the necessity to remove a spare tire from the rack. Also, while some forms of improved racks have been heretofore provided which enable spare tires to be more readily removed from beneath the rear of the load bed of a pickup truck and to be reinstalled beneath the pickup truck load bed, these newer forms of racks may require structural modifications to existing pickup trucks, be limited to specific wheel and tire sizes, or require excessive vertical clearance. Examples of several improved forms of tire racks including some of the general structural and operational features of the instant invention are disclosed in U.S. Pat. Nos. 1,913,835, 2,034,834, 3,175,742, 3,369,683 and 3,435,971.

BRIEF DESCRIPTION OF THE INVENTION

The rack of the instant invention has been constructed in a manner whereby a pickup truck spare tire may be supported therefrom and the rack may be utilized to support the spare tire of a pickup truck from an associated pickup truck in a matter enabling ready access to the spare tire. In addition, the rack is constructed in a manner whereby a spare tire may be readily reinstalled beneath the rear of a pickup truck load bed.

In addition, the spare tire rack is constructed in a manner whereby it will accommodate spare wheels having tires of different widths mounted thereon and the rack is further constructed in a manner whereby it provides amazing ease of operation.

The main object of this invention is to provide a pickup truck under load bed spare tire support rack which will enable a spare tire to be removed from and replaced beneath the rear portion of the load bed of a pickup truck.

Another object of this invention is to provide a spare tire rack constructed in a manner whereby it may be operated during removal or reinstallation of a spare tire with ease.

Yet another object of this invention is to provide a spare tire rack which may be readily utilized in conjunction with substantially all pickup trucks and with no modifications of the original pickup truck construction being required.

A final object of this invention to be specifically enumerated herein is to provide a spare tire rack in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary longitudinal vertical sectional view taken substantially upon the plane indicated by the section line 3—3 of FIG. 1.

BRIEF DESCRIPTION OF THE DRAWINGS

Figure 1:
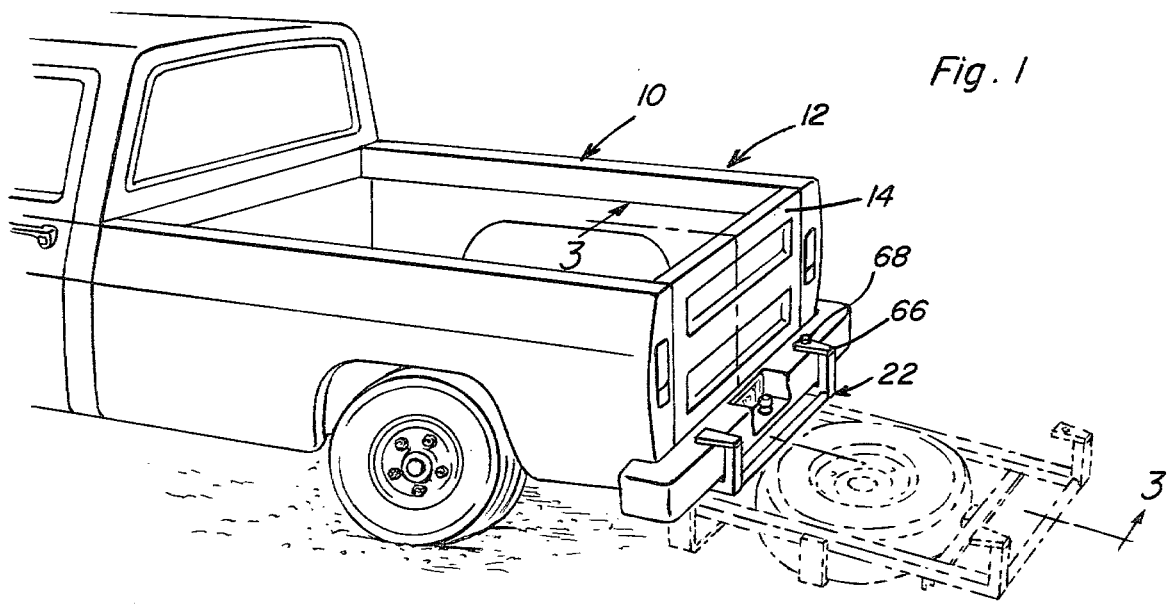
FIG. 1 is a fragmentary perspective view of the rear portion of a conventional form of pickup truck and with the spare tire rack of the instant invention illustrated in a stored position beneath the rear of the pickup truck, an extended position of the rack being illustrated in phantom lines.
Figure 2:
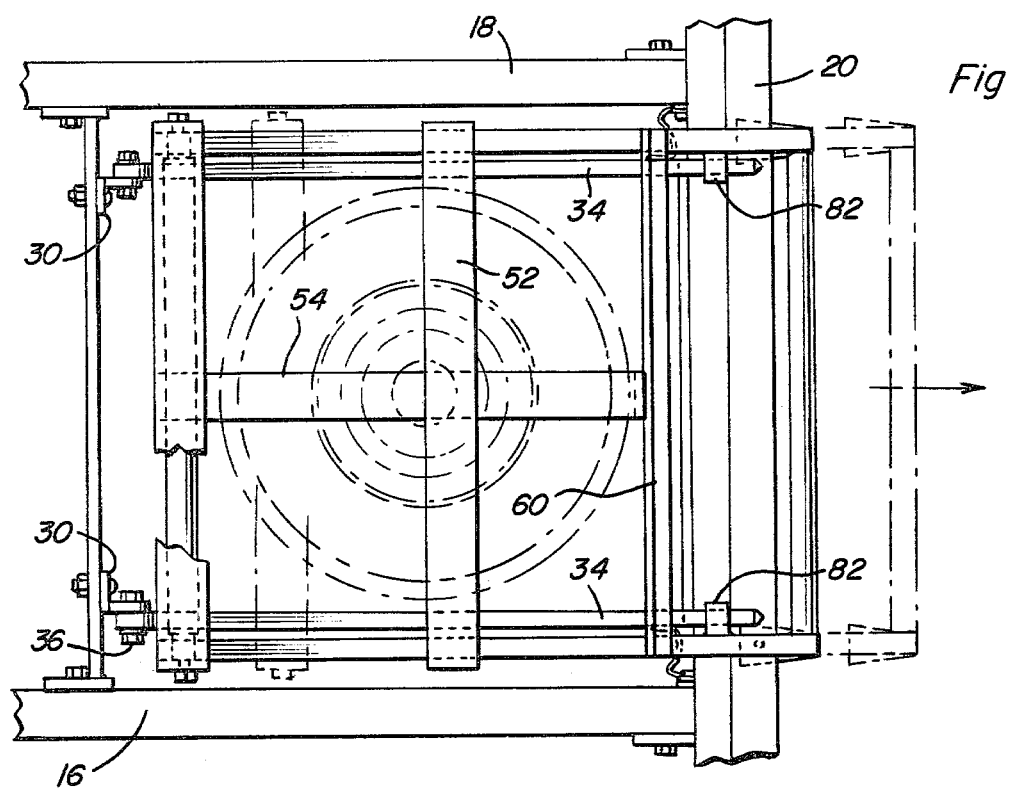
FIG. 2 is a fragmentary enlarged bottom plan view of the rear portion of the assembly illustrated in FIG. 1.
Figure 4:
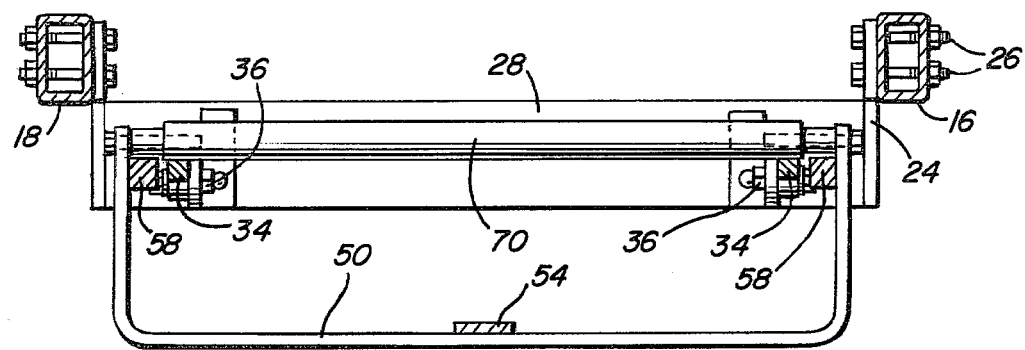
FIG. 4 is a transverse vertical sectional view taken substantially upon the plane indicated by the section line 4—4 of FIG. 3.

Referring now more specifically to the drawings, the numeral 10 generally designates a conventional form of pickup truck including a load bed 12 equipped with a rear tailgate 14. The pickup truck 10 includes opposite side longitudinal frame members 16 and 18 from which the load bed 12 is supported and the rear ends of the frame members 16 and 18 support a conventional step bumper 20 therefrom.

The spare tire rack of the instant invention is referred to in general by the reference numeral 22 and includes a pair of hanger brackets 24 secured to the inner sides of the frame members 16 and 18 by fasteners 26. The lower ends of the hangar brackets 24 project downwardly below the frame members 16 and 18 and are interconnected by a transverse brace 28 extending and secured therebetween.

A pair of pivot brackets 30 are supported from the transverse brace 28 and an elongated guide structure referred to in general by the reference numeral 32 is provided and includes a pair of opposite side longitudinally extending elongated guide members 34 whose forward ends are pivotally supported from the pivot brackets 30 by pivot fasteners 36. The rear ends of the guide members 34 include upstanding forwardly and upwardly inclined arms 38 and the upper ends of the arms are interconnected by a horizontal transverse brace member 40 extending and secured therebetween. Each of the arms 38 has one end of a limit cable 42 secured thereto as at 44 and the other ends of the limit cables 42 are anchored relative to the step bumper 20 as at 46. Thus, downward swinging of the rear end of the guide structure 32 relative to the truck 10 is limited to the rearwardly and downwardly inclined position of the guide structure 32 illustrated in phantom lines in FIG. 3.

In addition to the guide structure 32, the rack 22 includes a rack structure referred to in general by the reference numeral 48. The rack structure 48 includes a pair of front and rear upwardly opening U-shaped brackets 50 and 52 interconnected by a front to rear extending L-shaped bracket 54 including an upwardly directed portion 56 at its rear end. In addition, the rack structure 48 includes opposite side elongated, longitudinally extending side members 58 from which the U-shaped brackets 50 and 52 are supported and a transverse brace 60 extends between the rear end portions of the side members 58 and also has the upturned rear end 56 of the bracket 54 secured to its midportion. The rear ends of the side members 58 project rearwardly of the step bumper 20 and are interconnected by a transverse tubular member 62 extending therethrough and also include upwardly directed portions 64 terminating upwardly in forwardly directed portions 66 overlapping the upper surface of the step bumper 20. One of the forwardly directed portions 66 is provided with a vertical aperture and a fastener 68 is secured therethrough and into the bumper 20 for securement of the rear end of the rack structure 48 relative to the bumper 20.

The U-shaped bracket 50 has a roller 70 journaled between its upper end portions and the roller 70 overlies and is rollingly engaged with the guide members 34. Further, the opposite ends of the roller 70 are engageable with the forward upstanding edges of the arms 38 to limit rearward movement of the roller 70 along the guide members 34.

In operation, and with the assumption that the spare tire rack 22 is in the position thereof illustrated in solid lines in FIG. 3 of the drawings, the fasteners 68 is removed and the tubular member or handle 62 is engaged to rearwardly displace the rack structure 48 relative to the guide structure 32 sufficient to shift the portion 66 of the rack structure 48 slightly rearward of the step bumper 20. Thereafter, the tubular member or handle 62 is lowered until such time as the cables 42 limit downward swinging movement of the guide structure 32 to the phantom line position thereof illustrated in FIG. 3. Then, the handle or tubular member 62 may be rearwardly displaced in order to displace the rack structure rearwardly relative to the guide structure 32 until the rack structure 48 is in the phantom line position thereof illustrated in FIG. 3. Of course, inasmuch as the rack structure defines an upwardly opening receptacle in which to receive a spare tire and wheel assembly referred to in general by the reference numeral 80, the spare tire and wheel assembly may be readily removed from the rack structure 48.

Of course, if it is desired to reinstall a spare tire and wheel assembly beneath the rear of the load bed 12 of the pickup truck 10, the spare tire is placed within the rack structure 48 when the latter is in the phantom line position thereof illustrated in FIG. 3. Then, the tubular handle 62 is grasped and displaced forwardly until the rear sleeves 82 carried by the rear ends of side members 58 are telescoped over the rear tapered ends 84 of the guide members 34. Thereafter, the handle 62 is displaced upwardly to swing not only the rack structure 48 but also the guide structure 32 up into position beneath the load bed 10 and to position the portions 66 at an elevation above the step bumper 20. Thereafter, the handle 62 is displaced forwardly until such time as the portions 66 overlap the bumper 22 in the manner illustrated in solid lines in FIG. 3 and the fastener 68 is reinstalled.

It will be noted that even a heavy spare tire and wheel assembly 80 may be readily removed from beneath the load bed 12 of the truck 10 and that another wheel and tire assembly may be readily reinstalled within the rack structure 48.

Further, it will be noted that the spare tire rack 22 does not require extensive modifications of the existing pickup truck and that the rack structure 48 is capable of supporting a spare tire and wheel assembly including a wide tire therein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle including a marginal portion beneath which a spare tire wheel may be supported in generally horizontal position and including frame structure inwardly of said marginal portion and a structural member adjacent the outer margin of said marginal portion, a spare wheel rack assembly including an elongated guide structure having one end pivotally anchored to said frame structure for angular displacement relative thereto about a horizontal axis extending transversely of said guide structure between a first raised horizontal position and a second lowered position with the other end of said guide structure lowered relative to said one end, an elongated wheel supporting rack, support means pivotally supporting one end of said rack from said guide structure for angular displacement relative thereto about an axis transverse to said guide structure and said rack and movement of said axis along said guide structure between a first position with said rack one end closely adjacent said one end of said guide structure and the other end of said wheel supporting rack adjacent said other end of said guide structure and a second position with said rack one end adjacent said other end of said guide structure and said rack other end displaced endwise outwardly of said guide structure other end, said other ends of said guide structure and rack including coacting releasably engagable means operative to supportingly engage the other end of said guide structure from said other end of said rack against relative vertical shifting of said other ends upon final movement of said rack from its second position to its first position and disengageable upon initial movement of said rack to its second position, said other end of said rack and said marginal portion including coacting latching structure releasably engageable with each other when said rack and guide structures are in their first positions, and pivot limiting means operatively connected between said structural member and said other end of said guide structure limiting downwardly swinging movement of said other end of said guide structure relative to said structural member.

2. The combination of claim 1 wherein said vehicle marginal portion comprises the rear end of said vehicle.

3. The combination of claim 2 wherein said vehicle comprises a pickup truck.

4. The combination of claim 1 wherein said guide structure includes a pair of opposite side elongated guide members having their forward ends pivotally anchored relative to said frame structure, said support means including transverse roller means journaled from said one end of said rack rollingly engaged with the upper surfaces of said guide members.

5. The combination of claim 4 including means interconnecting the rear ends of said guide members forward of the rear ends thereof, said coacting releasably engageable means including the rear ends of said guide members and sleeve portions carried by said rack telescopingly engageable over the rear ends of said guide members when said rack is disposed in its first position relative to said guide structure.

6. The combination of claim 5 wherein said vehicle marginal portion comprises the rear end of said vehicle.

7. The combination of claim 6 wherein said vehicle comprises a pickup truck.

* * * * *